United States Patent
Mizuno et al.

(10) Patent No.: US 9,461,349 B2
(45) Date of Patent: ***Oct. 4, 2016

(54) RECHARGEABLE METAL $N_xO_y$ GAS BATTERY SYSTEM

(71) Applicant: Toyota Motor Engineering & Manufacturing North America, Inc., Erlanger, KY (US)

(72) Inventors: Fuminori Mizuno, Ann Arbor, MI (US); Paul T. Fanson, Brighton, MI (US); Charles A. Roberts, Ann Arbor, MI (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 267 days.

This patent is subject to a terminal disclaimer.

(21) Appl. No.: 14/221,814

(22) Filed: Mar. 21, 2014

(65) Prior Publication Data

US 2015/0194716 A1    Jul. 9, 2015

Related U.S. Application Data

(63) Continuation-in-part of application No. 14/150,168, filed on Jan. 8, 2014, now Pat. No. 9,331,369.

(51) Int. Cl.
*H01M 8/22* (2006.01)
*H01M 4/13* (2010.01)
(Continued)

(52) U.S. Cl.
CPC ............ *H01M 12/08* (2013.01); *F01N 3/0842* (2013.01); *F01N 3/10* (2013.01); *H01M 8/0606* (2013.01); *H01M 8/22* (2013.01)

(58) Field of Classification Search
CPC .......... H01M 8/22; H01M 4/13; H01M 4/66; H01M 8/222
See application file for complete search history.

(56) References Cited

U.S. PATENT DOCUMENTS

| | | |
|---|---|---|
| 3,804,739 A | 4/1974 | Bergeron |
| 3,979,225 A | 9/1976 | Smith et al. |

(Continued)

FOREIGN PATENT DOCUMENTS

| | | |
|---|---|---|
| CN | 102208653 | 10/2011 |
| CN | 102371888 | 3/2012 |

(Continued)

OTHER PUBLICATIONS

International Search Report and Written Opinion issued Jun. 10, 2015 in PCT/IB 14/02809 filed on Sep. 29, 2014.

(Continued)

*Primary Examiner* — Patrick Ryan
*Assistant Examiner* — Julian Anthony
(74) *Attorney, Agent, or Firm* — Oblon, McClelland, Maier & Neustadt, L.L.P.

(57) ABSTRACT

A metal-nitric oxide electrochemical cell which is fed a gas comprising nitric oxide (NO) and at least one gas selected from the group consisting of a nitrogen oxide of formula $N_xO_y$, oxygen, water vapor, a gaseous hydrocarbon, carbon monoxide and carbon dioxide is provided. Also provided is a rechargeable battery containing the metal-nitrogen oxides electrochemical cell. A vehicle system wherein exhaust gas from a combustion engine serves as a feed of active cathode material to a metal-nitrogen oxides battery is additionally provided.

16 Claims, 4 Drawing Sheets

(51) Int. Cl.
  *H01M 4/58* (2010.01)
  *H01M 6/16* (2006.01)
  *H01M 4/02* (2006.01)
  *H01M 4/36* (2006.01)
  *H01M 4/62* (2006.01)
  *H01M 12/08* (2006.01)
  *H01M 8/06* (2016.01)
  *F01N 3/10* (2006.01)
  *F01N 3/08* (2006.01)

(56) References Cited

U.S. PATENT DOCUMENTS

| | | | |
|---|---|---|---|
| 4,069,371 A * | 1/1978 | Zito | H01M 10/36 |
| | | | 429/409 |
| 4,321,313 A | 3/1982 | Langer et al. | |
| 4,390,602 A * | 6/1983 | Struthers | H01M 2/26 |
| | | | 429/101 |
| 5,084,144 A | 1/1992 | Reddy et al. | |
| 5,447,610 A | 9/1995 | Sharifian | |
| 5,489,421 A | 2/1996 | Van Velzen | |
| 5,976,721 A | 11/1999 | Limaye | |
| 7,740,982 B2 | 6/2010 | Yoshizawa et al. | |
| 8,647,482 B2 * | 2/2014 | Huang | B01D 53/326 |
| | | | 204/241 |
| 2002/0160251 A1 | 10/2002 | Chang et al. | |
| 2009/0004072 A1 | 1/2009 | Hamamoto et al. | |
| 2009/0084085 A1 | 4/2009 | Kawai | |
| 2010/0247981 A1 | 9/2010 | Huang | |
| 2012/0094193 A1 | 4/2012 | Albertus et al. | |
| 2012/0141889 A1 | 6/2012 | Lee et al. | |
| 2013/0089810 A1 | 4/2013 | Hiraiwa et al. | |
| 2013/0216924 A1 | 8/2013 | Hillhouse | |

FOREIGN PATENT DOCUMENTS

| | | |
|---|---|---|
| JP | 2011-070835 | 4/2011 |
| KR | 20090026589 | 3/2009 |

OTHER PUBLICATIONS

U.S. Appl. No. 14/222,989, filed Mar. 24, 2014, Mizuno, et al.

* cited by examiner

RECHARGEABLE METAL $N_xO_y$ GAS BATTERY SYSTEM

CROSS REFERENCE TO RELATED APPLICATIONS

This application is a continuation in part of prior U.S. application Ser. No. 14/150,168, filed Jan. 8, 2014, the disclosure of which is incorporated herein by reference in its entirety.

BACKGROUND OF THE INVENTION

The present invention is directed to a metal-gas battery with a cathode comprising nitric oxide (NO) as an active material wherein the nitric oxide may be supplied in the form of an exhaust stream from a combustion process.

In prior U.S. application Ser. No. 14/150,168, a metal-nitric oxide battery was described. The metal-nitric oxide battery is of great interest due to properties such as 1) a high redox potential at 1.0 V. vs. $Ag/Ag^+$; 2) high reversibility; and 3) negligible influence of the supporting electrolyte salt on the NO redox reaction in comparison to a metal-$O_2$ gas battery. In one embodiment described in the previous application, exhaust gas from a combustion engine was collected in a NO absorber which served as a supply source of NO for the battery.

Nitric oxide is known to undergo oxidation to higher nitrogen oxides such as $NO_2$ and $N_2O_4$ in the presence of $H_2O$ and $O_2$, both of which are components of a combustion exhaust stream. Moreover, such an exhaust stream will also contain hydrocarbons and carbon monoxide.

Purification of the exhaust gas containing NO produced by combustion of a fossil fuel such as gasoline may be contemplated in order to maximize efficiency of a metal-nitric oxide battery system. However, the inventors have recognized that the technology required for isolation and purification of the NO would add cost and equipment to the system. Therefore, in order to increase the potential efficiency and utility of the metal-nitric oxide battery system there is a need to identify and develop a battery capable of functioning with an NO feed which is an exhaust gas composition containing nitric oxide.

SUMMARY OF THE INVENTION

This and other objects are addressed by the present invention, the first embodiment of which includes an electrochemical cell comprising: an anode comprising a metal; a porous cathode supplied with a gas comprising nitric oxide (NO) and at least one gas selected from the group consisting of a nitrogen oxide of formula $N_xO_y$, oxygen, water vapor, a gaseous hydrocarbon, carbon monoxide and carbon dioxide; a separator located between the anode and cathode; and an electrolyte; wherein the active cathode ingredient is NO or the compound of formula $N_xO_y$, x is 1 or 2 and y is an integer of 1 to 4.

In one specific embodiment of the present invention, the metal of the anode comprises one selected from the group consisting of lithium, sodium, potassium, magnesium, calcium, aluminum and zinc.

In a further embodiment, the anode metal is lithium.

The present invention further includes a rechargeable battery which contains the electrochemical cell of the previous embodiments.

In a further specialized embodiment of the present invention the rechargeable battery comprises a gas inlet for introduction of a gas feed comprising NO which is an exhaust stream from a combustion engine.

In another embodiment, the present invention includes a vehicle having an internal combustion engine having an exhaust comprising NO and at least one gas selected from the group consisting of a nitrogen oxide of formula $N_xO_y$, oxygen, water vapor, a gaseous hydrocarbon, carbon monoxide and carbon dioxide; and the rechargeable battery of the further specialized embodiment.

The foregoing paragraphs have been provided by way of general introduction, and are not intended to limit the scope of the following claims. The presently preferred embodiments, together with further advantages, will be best understood by reference to the following detailed description taken in conjunction with the accompanying drawings.

DESCRIPTION OF THE PREFERRED EMBODIMENTS OF THE INVENTION

The present inventors are conducting a wide scale study and evaluation of materials which may function as cathode active materials for a metal-gas battery. The object of this study is to discover a cathode active gas source to function in a metal-gas battery of a vehicle having high capacity and high working potential. The cathodic gas should be an exhaust gas from a combustion engine which is readily available, safe, easy to handle and obtain and cost efficient.

Throughout this description all ranges described include all values and sub-ranges therein, unless otherwise specified. Additionally, the indefinite article "a" or "an" carries the meaning of "one or more" throughout the description, unless otherwise specified.

According to the present invention the term "vehicle" means any power driven device designed for transportation including an automobile, truck van, bus, golf cart and other utility forms of transportation.

In the course of study and evaluation of potential gas cathodic materials, the present inventors have surprisingly discovered that nitric oxide (NO) can function as a cathode gas for a metal-gas electrochemical cell. The experiments described in the Examples indicate that NO gas possesses higher working voltage as well as higher reversibility (rechargeability) than $O_2$ gas. Moreover, the studies described also indicate that when NO is employed as the cathode gas, the charged and discharged states are kept on the cathode, thus showing redox performance. In addition, the working voltage as well as voltage hysteresis of the cell may be significantly improved by introducing NO gas into a metal-gas battery.

Moreover, the present inventors have discovered that a gas containing NO and components typically found in an exhaust of a combustion engine may effectively serve as the source of active material to be fed to the cathode. Such unexpected discovery may allow for the development of an energy system in a vehicle composed of a metal NO gas battery wherein the exhaust gas of a combustion engine is the source of the gas fed to the cathode of the battery.

Figure 1:
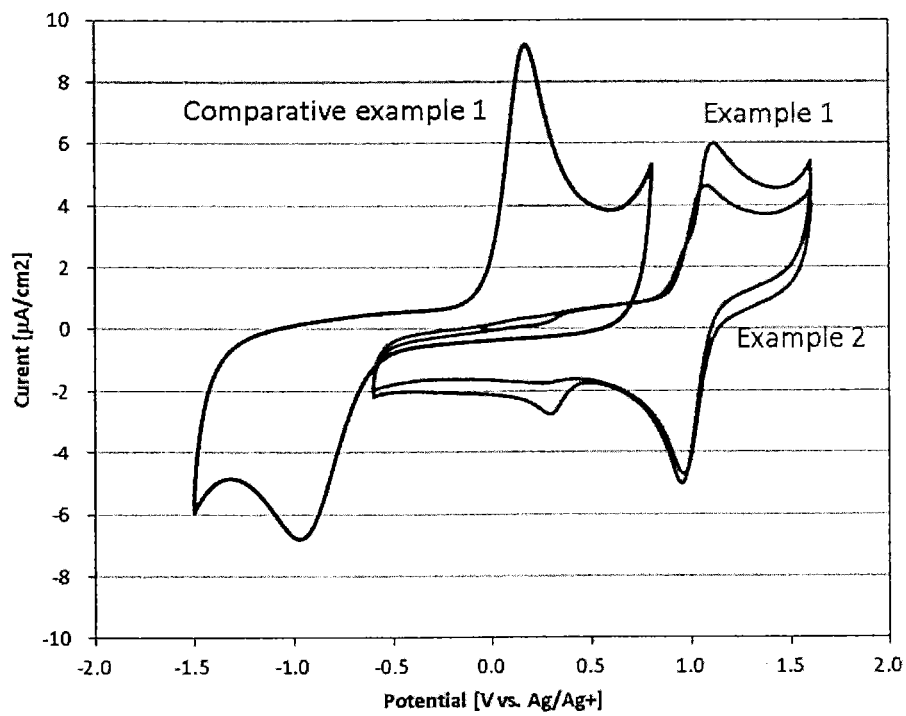
FIG. 1 shows the cyclic voltammograms of NO gas in the 0.2 mol/kg PP13TFSI-LiTFSI and 0.1 mol/kg PP13TFSI-MG(TFSI)$_2$ solutions (Examples 1 and 2) in comparison with pure $O_2$ gas in the 0.2 mol/kg PP13TFSI-LiTFSI (Comparative example 1).

As shown in the Examples and FIG. 1, the inventors have determined that NO gas exhibits a redox reaction with narrow peak separation during oxidation/reduction. Compared with other gases, NO gas shows an improved rechargeability.

Regarding working voltage, NO also has a high operation voltage. Its working voltage is estimated at 4.2V vs. Li/Li$^+$ (1.1V vs. Ag/Ag$^+$), which is extremely high when compared to that of the oxygen redox reaction (ORR) (2.2-2.7V vs. Li/Li$^+$), as also shown in FIG. 1.

Figure 4:
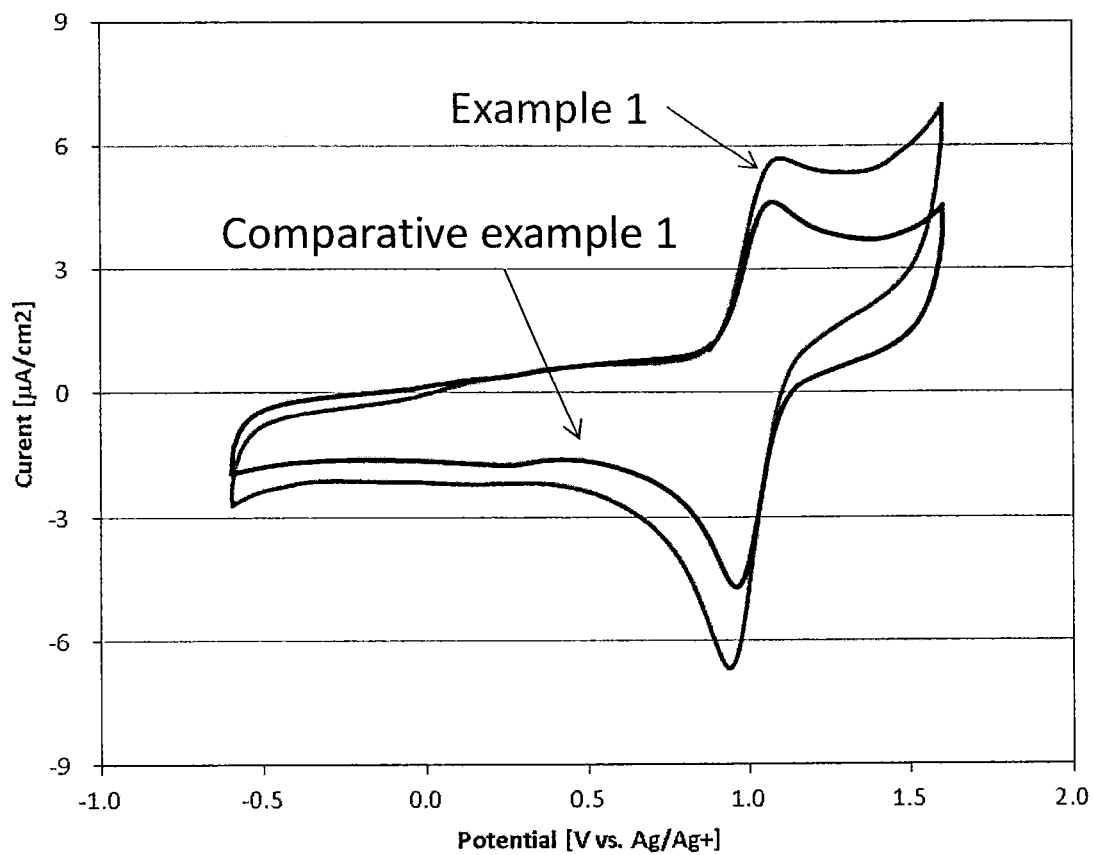
FIG. 4 shows the cyclic voltammograms of Example 2 and Example 3 in the N-methyl-N-propylpiperidinium bis(trifluoromethansulfonyl)imide (PP13TFSI) based electrolyte solutions in Testing of NO mixed with Exhaust Components.
Figure 5:
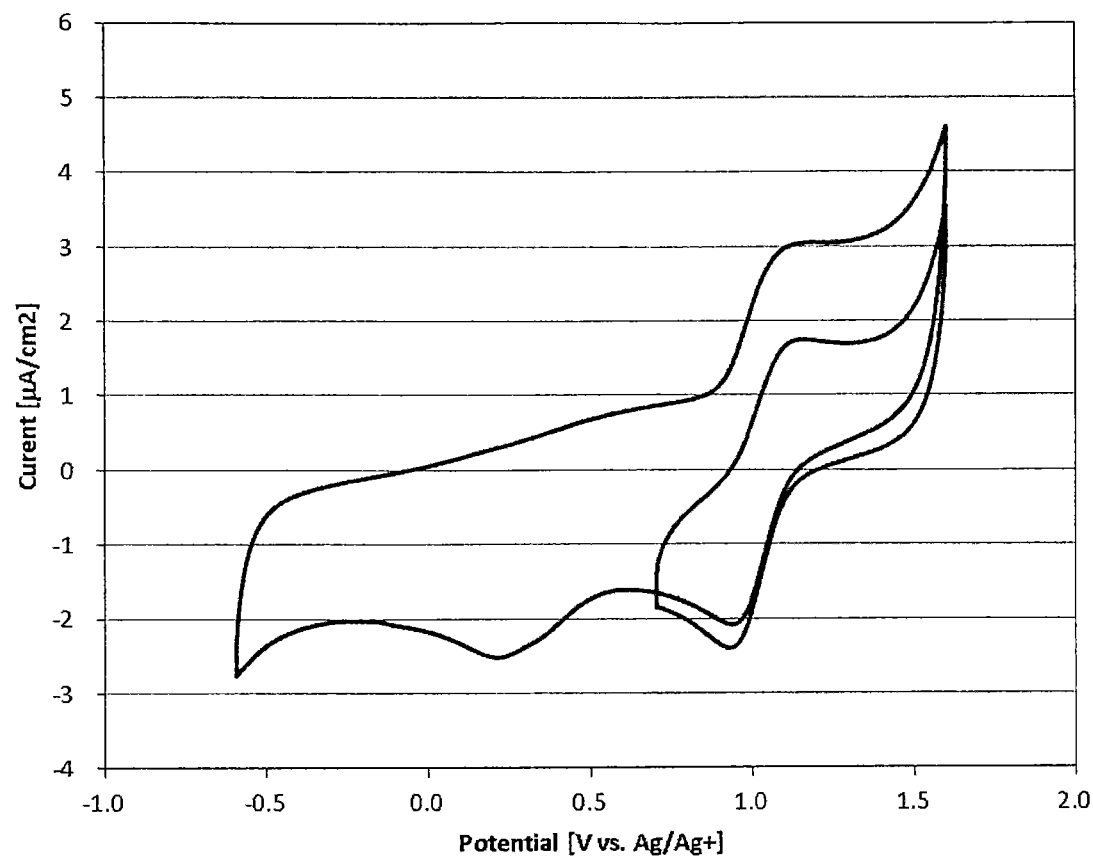
FIG. 5 shows the cyclic voltammograms of Example 4-1 and Example 4-2 in the N-methyl-N-propylpiperidinium bis(trifluoromethansulfonyl)imide (PP13TFSI) based electrolyte solutions in Testing of NO mixed with Exhaust Components.

The inventors have further shown in FIGS. 4 and 5 that even when NO is mixed with nitrogen oxides such as $NO_2$, the $N_xO_y$ gas redox reaction was observed, and the redox performance was quite similar to that of the pure NO gas reaction. Even under exhaust gas condition, the $N_xO_y$ gas redox reaction was observed, and then it was quite similar in performance to that of pure NO gas reaction. Other species such as hydrocarbons and carbon monoxide do not show any influence on the $N_xO_y$ redox reaction.

Therefore, the first embodiment of the present invention is an electrochemical cell comprising: an anode comprising a metal; a porous cathode supplied with a gas comprising nitric oxide (NO) and at least one gas selected from the group consisting of a nitrogen oxide of formula $N_xO_y$, oxygen, water vapor, a gaseous hydrocarbon, carbon monoxide and carbon dioxide; a separator located between the anode and cathode; and an electrolyte; wherein the active cathode ingredient is NO or the compound of formula $N_xO_y$, wherein x is 1 or 2 and y is an integer of 1 to 4.

Without being limited by theory, the inventors believe an element of the present invention is to include a $N_xO_y$ gas having an unpaired electron as a reactive gas, i.e., active cathode material, wherein the $N_xO_y$ gas defines NO, $NO_2$ and $N_2O_4$. This $N_xO_y$ gas is included in the exhaust gas.

The inventors have surprisingly discovered that even though the NO gas is exposed to ambient air, forming the $NO_2$ gas, almost the same redox activity was observed (FIG. 4). The $N_xO_y$ gas mixture is a highly reactive gas group which provides superior properties as a cathode active material in a metal-gas battery.

In an embodiment of the present invention, the positive electrode may be a porous unit construction comprising an oxidation reduction catalyst, a conductive material and a binder. The cathode may be constructed by mixing the redox catalyst, conductive material and optionally the binder and applying the mixture to a current collector of appropriate shape. The oxidation reduction catalyst may be any material which promotes the $N_xO_y$ redox reaction. Examples of a suitable catalyst active component include but are not limited to an alkali or alkali earth metal in the form of its oxide ($Li_2O$, $Na_2O$, $K_2O$, MgO, CaO, SrO, BaO), hydroxide (LiOH, NaOH, KOH, $Mg(OH)_2$, $Ca(OH)_2$, $Sr(OH)_2$, $Ba(OH)_2$), carbonate ($Li_2CO_3$, $Na_2CO_3$, $K_2CO_3$, $MgCO_3$, $CaCO_3$, $SrCO_3$, $BaCO_3$), or any combination thereof. The active component is typically impregnated on a high surface area oxide support such as $Al_2O_3$, $ZrO_2$, $TiO_2$, $CeO_2$, or any mixed oxide thereof. The rate of $N_xO_y$ absorption may be increased by the addition of a precious metal such as Pt, Pd, Rh, or any combination thereof. The positive electrode may contain an electrically-conductive material which is chemically stable in the potential window of use of the cell. Preferably the conductive material is porous and has a large specific surface area to provide high output. An example of such material may include but is not limited to a carbonaceous material such as Ketjen black, acetylene black, vapor grown carbon fiber, graphene, natural graphite, artificial graphite and activated carbon. Other suitable conductive materials may be conductive fibers, such as a metal fiber, metal powder, such as nickel and aluminum, and organic conductive materials, such as a polyphenylene derivative. In some embodiments mixtures of these materials may be employed. Other suitable conductive materials may be conductive ceramics such as titanium nitride and titanium carbide.

Suitable binders known to one of ordinary skill which are chemically stable in the potential window of use of the cell may include thermoplastics and thermosetting resins. For example, polyethylene, polypropylene, polytetrafluoroethylene (PTFE), Polyvinylidene fluoride (PVDF), styrene butadiene rubber, a tetrafluoroethylene hexafluoro ethylenic copolymer, a tetrafluoroethylene hexafluoropropylene copolymer (FEP), a tetrafluoroethylene perfluoroalkyl vinyl ether copolymer (PFA), ethylene-tetrafluoroethylene copolymer (ETFE resin), polychlorotrifluoroethylene resin (PCTFE), a propylene-tetrafluoroethylene copolymer, an ethylene-chlorotrifluoroethylene copolymer (ECTFE) and an ethylene-acrylic acid copolymer. These binders may be used independently, or mixtures may be used.

The components may be wet blended in the presence of a suitable solvent or dry blended using a mortar or other conventionally known mixing equipment. The mixture may then be applied to a charge collector by conventionally known methods. Any suitable charge collector may be employed. Preferred charge collectors may be any of carbon, stainless steel, nickel, aluminum and copper. In order to assist diffusion of the $N_xO_y$, it may be preferable that the collector is a porous body, such as mesh. In certain embodiments the charge collector may comprise a protective coating of an oxidation-resistant metal or alloy to protect the collector from oxidation.

In one specific embodiment of the present invention, the metal of the negative electrode comprises one selected from the group consisting of lithium, sodium, potassium, magnesium, calcium, aluminum and zinc and in a specific embodiment the metal of the negative electrode is one of lithium and magnesium.

The electrolyte ion conducting medium which is interposed between the positive electrode and the anode may comprise as an electrolyte, one or more of $LiPF_6$, $LiClO_4$, $LiAsF_6$, $LiBF_4$, $LiN(CF_3SO_2)_2$, $Li(CF_3SO_3)$ and $LiN(C_2F_5SO_2)_2$. A nonaqueous solvent is preferred and may be selected from organic solvents including cyclic carbonates, chain carbonates, cyclic esters, cyclic ethers and chain ethers. Examples of a cyclic carbonate include ethylene carbonate, propylene carbonate, butylene carbonate and vinylene carbonate. Examples of a chain carbonate include dimethyl carbonate, diethyl carbonate and methylethyl carbonate. Examples of a cyclic ester carbonate include gamma butyrolactone and gamma valerolactone. Examples of a cyclic ether include tetrahydrofuran and 2-methyltetrahydrofuran. Examples of a chain ether include dimethoxyethane and ethyleneglycol dimethyl ether. In some preferred embodiments the solvent may be a nitrile system solvent such as acetonitrile or an ionic liquid. Ionic liquids comprises any of cations such as imidazolium cation, piperidinium cation, pyrrolidinium cation and ammonium cation and any of anions such as bis(trifluoromethansulfonyl)imide anion, bis(fluorosulfonyl)imide anion, tetrafluoroborate anion and hexafluorophosphate anion. In one preferred embodiment the solvent is an ionic liquid such as N-methyl-N-propylpiperidinium bis(trifluoromethansulfonyl)imide (PP13TFSI).

Figure 3:
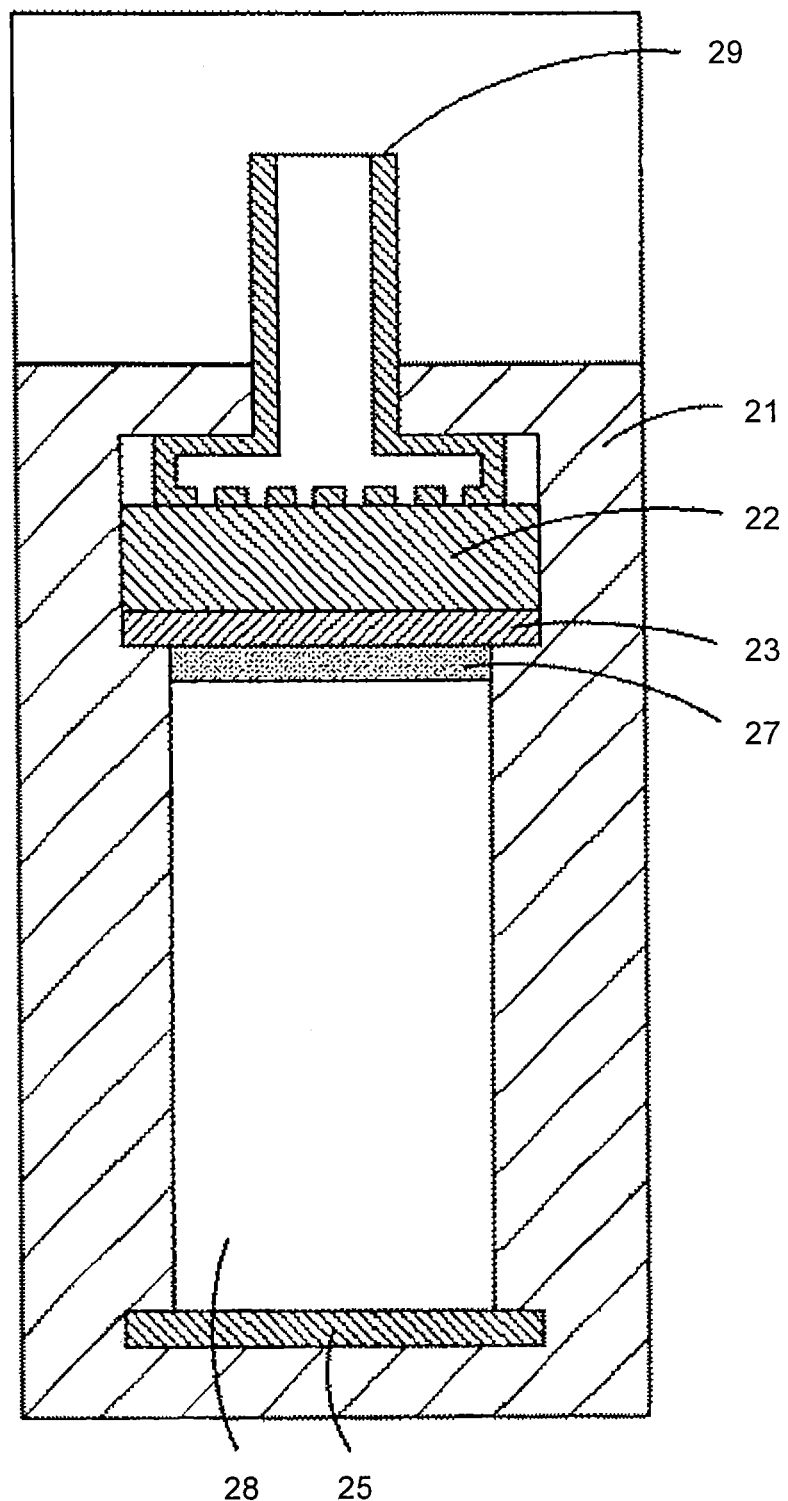
FIG. 3 shows a schematic diagram of a NO electrochemical cell according to one embodiment of the present invention.

An example of an electrochemical cell according to the present invention is shown in FIG. 3. The negative electrode 25 is placed in a casing 21 and the positive electrode 23 is placed to oppose the negative electrode 25 via separator 27. The electrolyte 28 is between the positive electrode 23 and the negative electrode 25. A porous board 22 is on the positive electrode 23, and NO supply inlet 29 is in communication with the positive electrode across the porous board.

The present invention further provides a rechargeable battery comprising the metal-NO electrochemical cell.

As $N_xO_y$ gases are components of the exhaust of combustion engines, this discovery may have significant environmental and energy ramifications because a system wherein $N_xO_y$ is supplied via the exhaust gas of the combustion engine and fed to a metal-$N_xO_y$ battery may be constructed.

Thus in a further embodiment, the present invention provides a rechargeable battery equipped with a $N_xO_y$ gas feed and in a special embodiment the gas feed is a component of a system wherein the exhaust of a combustion engine serves as the active material feed source. In another embodiment, the exhaust fed to the metal-$N_xO_y$ battery may be enriched with NO within the feed system. In order to protect the battery, the exhaust feed may be cooled before entry into the battery. The feed of the gas may be either continuous or of intermittent flow.

Having generally described this invention, a further understanding can be obtained by reference to certain specific examples which are provided herein for purposes of illustration only and are not intended to be limiting unless otherwise specified.

EXAMPLES

Testing of NO as a Cathodic Active Material

Test cells containing working, counter and reference electrodes were constructed to compare $O_2$ and NO as cathodic active materials.

The test gas was obtained from respective high grade gas cylinders. The working, counter and reference electrodes were glassy carbon as rod, Pt wire and Ag wire in the acetonitrile solution containing tetrabutyl ammonium perchlorate (TBAP) and $AgNO_3$ as supporting salt, respectively. The scan rate was 50 mV/sec and the operation temperature was room temperature.

FIG. 1 shows the cyclic voltammograms in the N-methyl-N-propylpiperidinium bis(trifluoromethansulfonyl)imide (PP13TFSI) based electrolyte solution;

Comparative Example 1 under pure $O_2$ gas in the 0.2 mol/kg PP13TFSI-LiTFSI solution

Example 1 under NO/Ar/He mixed gas (1%/1%/98% in vol) in the 0.2 mol/kg PP13TFSI-LiTFSI solution Example 2 under NO/Ar/He mixed gas (1%/1%/98% in vol) in the 0.1 mol/kg PP13TFSI-Mg(TFSI)$_2$ solution As can be seen, a cathodic peak due to O2 reduction was observed at around −1.0V vs. Ag/Ag$^+$, while the peaks attributed to NO$^+$ reduction were observed at +1.0V vs. Ag/Ag$^+$. Furthermore, a large peak separation (1.2V) between reduction and oxidation was observed under $O_2$ atmosphere, while a small separation (less than 0.2V) was observed under NO atmosphere. This result indicates that NO gas possesses higher working voltage as well as higher reversibility (rechargeability) than $O_2$ gas.

Figure 2:
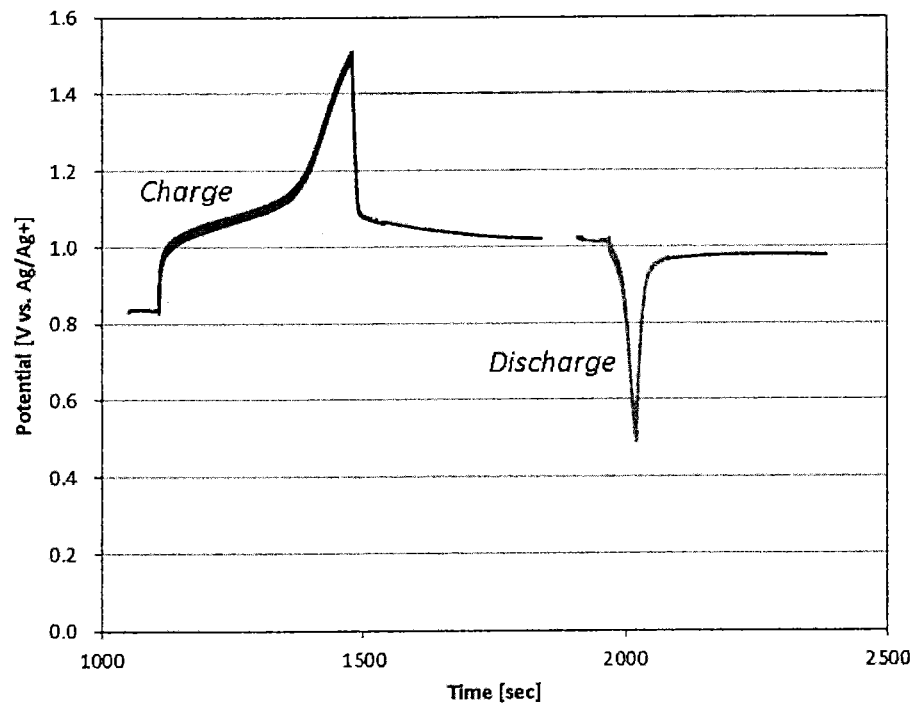
FIG. 2 shows the charge-discharge profiles of NO gas in the 0.2 mol/kg PP13TFSI-LiTFSI solution.

A cell of the same construction described above having NO gas as cathodic material and 0.2 mol/kg PP13TFSI-LiTFSI solution as electrolyte was maintained at a current density of 700 nA/cm$^2$ and the charge-discharge profiles measured as shown in FIG. 2. The charge and discharge plateaus were observed at around 1.05V and 0.95V vs. Ag/Ag$^+$, respectively. Also, when the cell was held at open circuit potential, the flat potential after charging and discharging was observed slightly above 1.0V and below 1.0V vs. Ag/Ag$^+$, respectively. Thus, the charged and discharged states were maintained on the cathode and provided evidence of a NO redox reaction. The working voltage as well as voltage hysteresis was significantly improved by introducing NO gas into a metal-gas battery.

Testing of NO Mixed with Exhaust Components

Test cells containing working, counter and reference electrodes were constructed to compare different NO containing gases as cathodic active materials. Cyclic voltammograms were then obtained. FIG. 4 shows the cyclic voltammograms in the N-methyl-N-propylpiperidinium bis(trifluoromethansulfonyl)imide (PP13TFSI) based electrolyte solutions:

Example 2 was run under pure NO/Ar/He(1%/1%/98%) gas condition in the 0.1 mol/kg PP13TFSI-Mg(TFSI)$_2$ solution. The color of the gas atmosphere of the cell is always transparent.

Example 3 was run under NO/Ar/He(1%/1%/98%) gas exposed to ambient air for 5 min in the 0.1 mol/kg PP13TFSI-Mg(TFSI)$_2$ solution. The color of gas atmosphere is slightly medium brown.

FIG. 5 shows the cyclic voltammograms in the N-methyl-N-propylpiperidinium bis(trifluoromethansulfonyl)imide (PP13TFSI) based electrolyte solutions:

Example 4-1 and 4-2 were run under pure $O_2$/NO/CO/$C_3H_6$/Ar/He (2%/0.4%/0.1%/0.13%/97.5%) gas condition in the 0.1 mol/kg PP13TFSI-Mg(TFSI)$_2$ solution with different scanning ranges. The color of the gas atmosphere is slightly medium brown.

Numerous modifications and variations on the present invention are possible in light of the above description and examples. It is therefore to be understood that within the scope of the following Claims, the invention may be practiced otherwise than as specifically described herein. Any such embodiments are intended to be within the scope of the present invention.

The invention claimed is:

1. A metal gas battery:
   an anode comprising a metal as an active anodic ingredient;
   a porous cathode in contact with a gas mixture comprising nitric oxide (NO) and at least one gas different from NO selected from the group consisting of a nitrogen oxide of formula $N_xO_y$, oxygen, water vapor, a gaseous hydrocarbon, carbon monoxide and carbon dioxide;
   a separator located between the anode and cathode; and
   an electrolyte;
   wherein an active ingredient at the porous cathode is NO or the compound of formula $N_xO_y$, wherein x is 1 or 2 and y is an integer of 1 to 4, and
   the metal gas battery is rechargeable.

2. The metal gas battery according to claim 1 wherein the metal of the anode comprises one selected from the group consisting of lithium, sodium, potassium, magnesium, calcium, aluminum and zinc.

3. The metal gas battery according to claim 2, wherein the metal comprises lithium.

4. The metal gas battery according to claim 2, wherein the metal comprises magnesium.

5. The metal gas battery according to claim 1, wherein the cathode comprises a porous charge collector and the porous charge collector is coated with a mixture of an oxidation reduction catalyst, a conductive material and a binder.

6. The metal gas battery according to claim 5, wherein the oxidation reduction catalyst is capable of absorption of NO or $N_xO_y$.

7. The metal gas battery according to claim 5, wherein the oxidation reduction catalyst comprises at least one of an alkali metal oxide, alkaline earth metal oxide, an alkali metal carbonate and an alkaline earth metal carbonate.

8. The metal gas battery according to claim 5, wherein the oxidation reduction catalyst further comprises at least one precious metal selected from the group consisting of Pt, Pd and Rh.

9. The metal gas battery according to claim 5, wherein the oxidation reduction catalyst further comprises a porous electrically-conductive material.

10. The metal gas battery according to claim 9, wherein the porous electrically-conductive material comprises at least one selected from the group consisting of Ketjen black, acetylene black, vapor grown carbon fiber, graphene, natural graphite, artificial graphite, activated carbon, a conductive metal fiber, a metal powder, an organic conductive material and a conductive ceramic.

11. The metal gas battery according to claim 5, wherein the oxidation reduction catalyst is impregnated on at least one support selected from the group consisting of $Al_2O_3$, $ZrO_2$, $TiO_2$ and $CeO_2$.

12. The metal gas battery according to claim 1, wherein the battery comprises a gas inlet for introduction of a gas feed comprising NO or $N_xO_y$, which is an exhaust stream from a combustion engine.

13. A vehicle comprising:
    an internal combustion engine having an exhaust comprising NO and at least one gas selected from the group consisting of a nitrogen oxide of formula $N_xO_y$, oxygen, water vapor, a gaseous hydrocarbon, carbon monoxide and carbon dioxide; and
    a battery according to claim 12.

14. The vehicle according to claim 13, wherein the anode of the battery comprises lithium.

15. The vehicle according to claim 13, wherein the anode of the battery comprises magnesium.

16. The metal gas battery according to claim 1, wherein the electrolyte is a nonaqueous electrolyte comprising at least one solvent selected from the group consisting of a cyclic carbonate, a chain carbonate, a cyclic ester, a cyclic ether, a chain ether, a nitrile and an ionic liquid.

* * * * *